(12) United States Patent
Murray

(10) Patent No.: US 12,221,659 B2
(45) Date of Patent: Feb. 11, 2025

(54) METHOD AND DEVICE FOR PRODUCING DIRECT REDUCED, CARBURIZED METAL

(71) Applicant: GREENIRON H2 AB, Sollentuna (SE)

(72) Inventor: Hans E. H. Murray, Djursholm (SE)

(73) Assignee: GREENIRON H2 AB, Sollentuna (SE)

( * ) Notice: Subject to any disclaimer, the term of this patent is extended or adjusted under 35 U.S.C. 154(b) by 510 days.

(21) Appl. No.: 17/642,890

(22) PCT Filed: Sep. 22, 2020

(86) PCT No.: PCT/SE2020/050885
§ 371 (c)(1),
(2) Date: Mar. 14, 2022

(87) PCT Pub. No.: WO2021/061038
PCT Pub. Date: Apr. 1, 2021

(65) Prior Publication Data
US 2023/0002841 A1    Jan. 5, 2023

(30) Foreign Application Priority Data
Sep. 23, 2019    (SE) .................... 1951070-0

(51) Int. Cl.
| | | |
|---|---|---|
| C21B 13/12 | (2006.01) | |
| C21B 13/00 | (2006.01) | |
| C22B 5/12 | (2006.01) | |
| C23C 8/22 | (2006.01) | |

(52) U.S. Cl.
CPC .......... *C21B 13/12* (2013.01); *C21B 13/0073* (2013.01); *C22B 5/12* (2013.01); *C23C 8/22* (2013.01)

(58) Field of Classification Search
CPC ....... C21B 13/12; C21B 13/0073; C23C 8/22; C22B 5/12
See application file for complete search history.

(56) References Cited

U.S. PATENT DOCUMENTS

| | | |
|---|---|---|
| 3,449,117 A | 6/1969 | Derham |
| 3,964,898 A | 6/1976 | Murray |
| 5,137,566 A | 8/1992 | Stephens, Jr. et al. |
| 5,387,274 A | 2/1995 | Dam |
| 5,542,963 A | 8/1996 | Sherwood |
| 6,569,220 B1 | 5/2003 | Clark et al. |
| 2001/0003930 A1 | 6/2001 | Montague et al. |
| 2001/0045142 A1 | 11/2001 | Hansmann et al. |
| 2002/0007699 A1 | 1/2002 | Montague et al. |
| 2012/0326363 A1 | 12/2012 | Millner et al. |
| 2013/0305883 A1 | 11/2013 | Martinis et al. |
| 2016/0017445 A1 | 1/2016 | Cheeley et al. |
| 2022/0010405 A1 | 1/2022 | Murray |
| 2022/0064744 A1 | 3/2022 | Murray |
| 2022/0119914 A1 | 4/2022 | Murray |
| 2023/0002841 A1 | 1/2023 | Murray |

FOREIGN PATENT DOCUMENTS

| | | |
|---|---|---|
| CN | 1353201 A | 6/2002 |
| CN | 103282520 A | 9/2013 |
| CN | 106702066 A | 5/2017 |
| CN | 207130292 U | 3/2018 |
| EP | 1201780 B1 | 3/2005 |
| IN | 2001MUM00198 | 2/2001 |
| JP | S4716312 B2 | 1/1972 |
| JP | S49117313 A | 11/1974 |
| JP | S5-083990 A | 7/1975 |
| JP | S50158513 A | 12/1975 |
| JP | H04254796 A | 9/1992 |
| JP | S47040197 B | 12/2004 |
| JP | 2007101021 A | 4/2007 |
| JP | 2011094172 A | 5/2011 |
| KR | 20110111735 A | 10/2011 |
| KR | 1020120074644 A | 7/2012 |
| RU | 2033431 C1 | 4/1995 |
| RU | 2122035 C1 | 11/1998 |
| SE | 382078 B | 1/1976 |
| SE | 7406174-8 B | 8/1979 |
| WO | 0132941 A1 | 5/2001 |
| WO | 2012091422 A2 | 7/2012 |
| WO | 2015016950 A1 | 2/2015 |

OTHER PUBLICATIONS

Amir Peyman Soleymani et al.: "Thermodynamic Study of Cementite Formation in Fe—C—O—H System"; Mineral Processing and Extractive Metallurgy Review, dated Oct. 2013, 11 pages.
International Search Report from corresponding International Application No. PCT/SE2020/050885, mailed on Nov. 20, 2020, 4 pages.

*Primary Examiner* — Jessee R Roe
(74) *Attorney, Agent, or Firm* — Tucker Ellis LLP

(57) ABSTRACT

Method and system for producing direct reduced metal material, comprising the steps: a) charging metal material to be reduced into a furnace space (120); b) evacuating an existing atmosphere from the furnace space to achieve a gas pressure of less than 1 bar therein, c) providing heat and hydrogen gas into the furnace space, so that heated hydrogen gas heats the charged metal material to a temperature high enough so that metal oxides present in the metal material are reduced, in turn causing water vapour to be formed, which hydrogen gas provision is performed so that a pressure of more than 1 bar builds up inside the furnace space; and d) before evacuating the built up overpressure, condensing and collecting the water vapour formed in step c in a condenser (160) below the charged metal material. The invention is characterised in that it further comprises the step e) before evacuating the build up overpressure, providing a carbon-containing gas to the furnace space, so that the heated and reduced metal material is carburized by said carbon-containing gas.

29 Claims, 6 Drawing Sheets

METHOD AND DEVICE FOR PRODUCING DIRECT REDUCED, CARBURIZED METAL

The present invention relates to a method and a device for producing direct reduced and carburized metal, and in particular direct reduced iron (also known as sponge iron) which is also carburized. In particular, the present invention relates to the direct reduction of metal ore under a controlled hydrogen atmosphere to produce such direct reduced metal, and to the provision of a carbon-containing gas as a part of the same process for carburizing the reduced metal material.

The production of direct reduced metal using hydrogen as a reducing agent is well-known as such. For instance, in SE7406174-8 and SE7406175-5 methods are described in which a charge of metal ore is subjected to a hydrogen atmosphere flowing past the charge, which as a result is reduced to form direct reduced metal.

Furthermore, in Swedish application SE 1950403-4, which has not been published at the priority date of the present application, a process for direct reducing metal material under a closed hydrogen atmosphere is disclosed.

The present invention is particularly applicable in the case of batchwise charging and treatment of the material to be reduced and carburized.

There are several problems with the prior art, including efficiency regarding thermal losses as well as hydrogen gas usage. There is also a control problem, since it is necessary to measure when the reduction process has been finalized.

Furthermore, known methods for carburizing metal material include the use of carbon monoxide as a source of carburizing carbon. This leads to the production and release of carbon dioxide, and typically also to the production of carbon monoxide.

It would hence be desirable to achieve a thermally and energy efficient method for direct reducing and carburizing of metal material that does not lead to the release into the atmosphere of carbon monoxide or carbon dioxide.

The present invention solves the above described problems.

Hence, the invention relates to a method for producing direct reduced metal material, comprising the steps: a) charging metal material to be reduced into a furnace space; b) evacuating an existing atmosphere from the furnace space so as to achieve a gas pressure of less than 1 bar inside the furnace space; c) providing heat and hydrogen gas into the furnace space, so that heated hydrogen gas heats the charged metal material to a temperature high enough so that metal oxides present in the metal material are reduced, in turn causing water vapour to be formed, which provision of hydrogen gas is performed so that a pressure of more than 1 bar builds up inside the furnace space; and d) before an evacuation of gases from the furnace space back to atmospheric pressure, condensing and collecting the water vapour formed in step c in a condenser below the charged metal material; which method is characterised in that the method further comprises the step e) before an evacuation of gases from the furnace space back to atmospheric pressure, providing a carbon-containing gas to the furnace space, so that the heated and reduced metal material is carburized by said carbon-containing gas.

The invention also relates to a system for producing direct reduced metal material, comprising a closed furnace space arranged to receive charged metal material to be reduced; an atmosphere evacuation means arranged to evacuate an existing atmosphere from the furnace space so as to achieve a gas pressure of less than 1 bar inside the furnace space; a heat and hydrogen provision means arranged to provide heat and hydrogen gas to the furnace space; a control device arranged to control the heat and hydrogen provision means so that heated hydrogen gas heats the charged metal material to a temperature high enough so that metal oxides present in the metal material are reduced, in turn causing water vapour to be formed, which provision of hydrogen gas is performed so that a pressure of more than 1 bar builds up inside the furnace space; and a cooling and collecting means arranged below the charged metal material, arranged to condense and collect the water vapour before an evacuation of gases from the furnace space back to atmospheric pressure, which system is characterised in that the system further comprises a carbon-containing gas provision means arranged to provide a carbon-containing gas to the furnace space, and in that the control device is arranged to control the carbon-containing gas provision means to provide carbon-containing gas before an evacuation of gases from the furnace space back to atmospheric pressure, so that the heated and reduced metal material is carburized by said carbon-containing gas.

In the following, the invention will be described in detail, with reference to exemplifying embodiments of the invention and to the enclosed drawings, wherein.

Figure 1A:
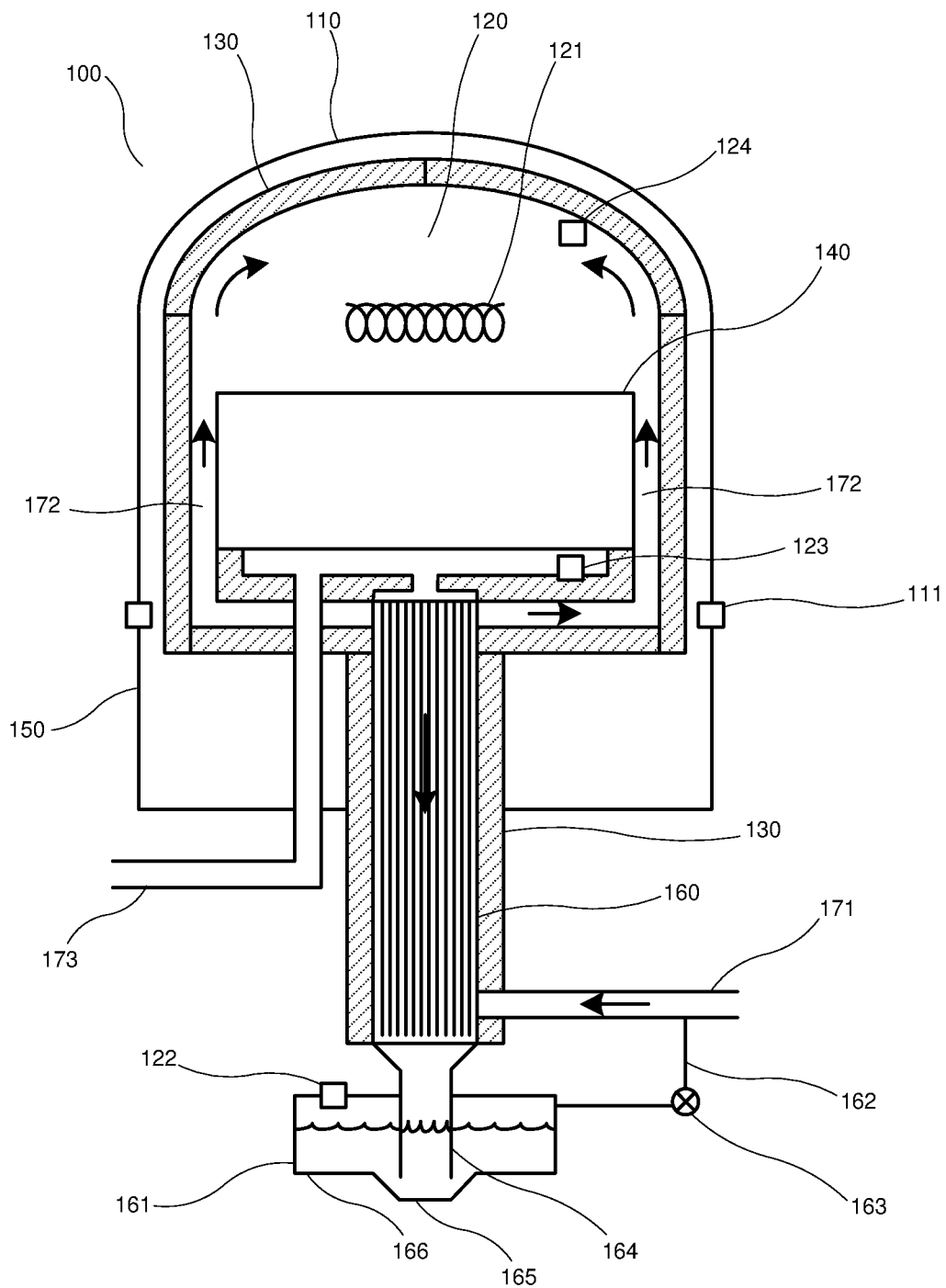
FIG. 1a is a cross-section of a simplified furnace for use in a system according to the present invention, during a first operation state.
Figure 1B:
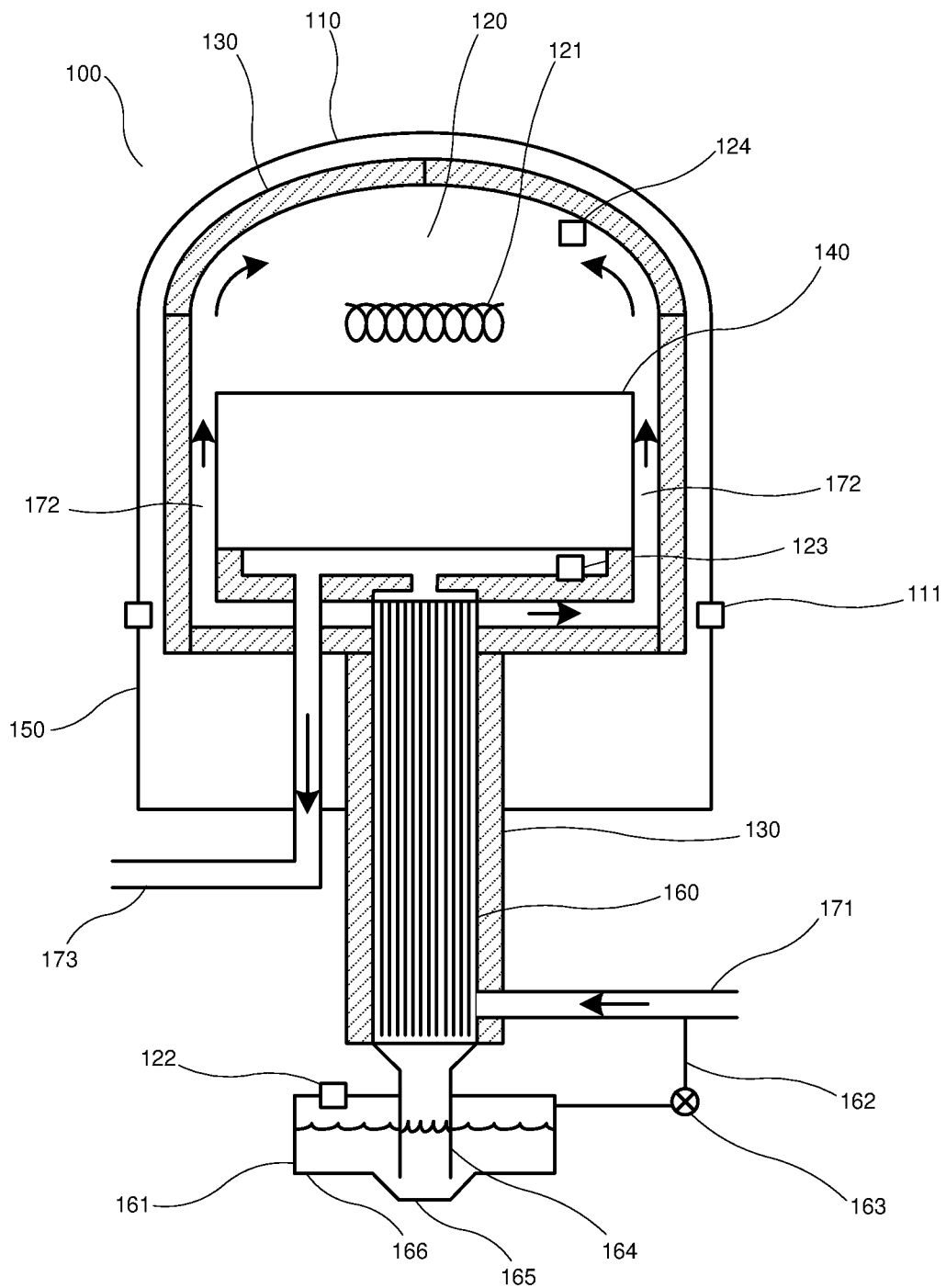
FIG. 1b is a cross-section of the simplified furnace of FIG. 1a, during a second operation state.

FIGS. 1a and 1b share the same reference numerals for same parts.

Figure 2:
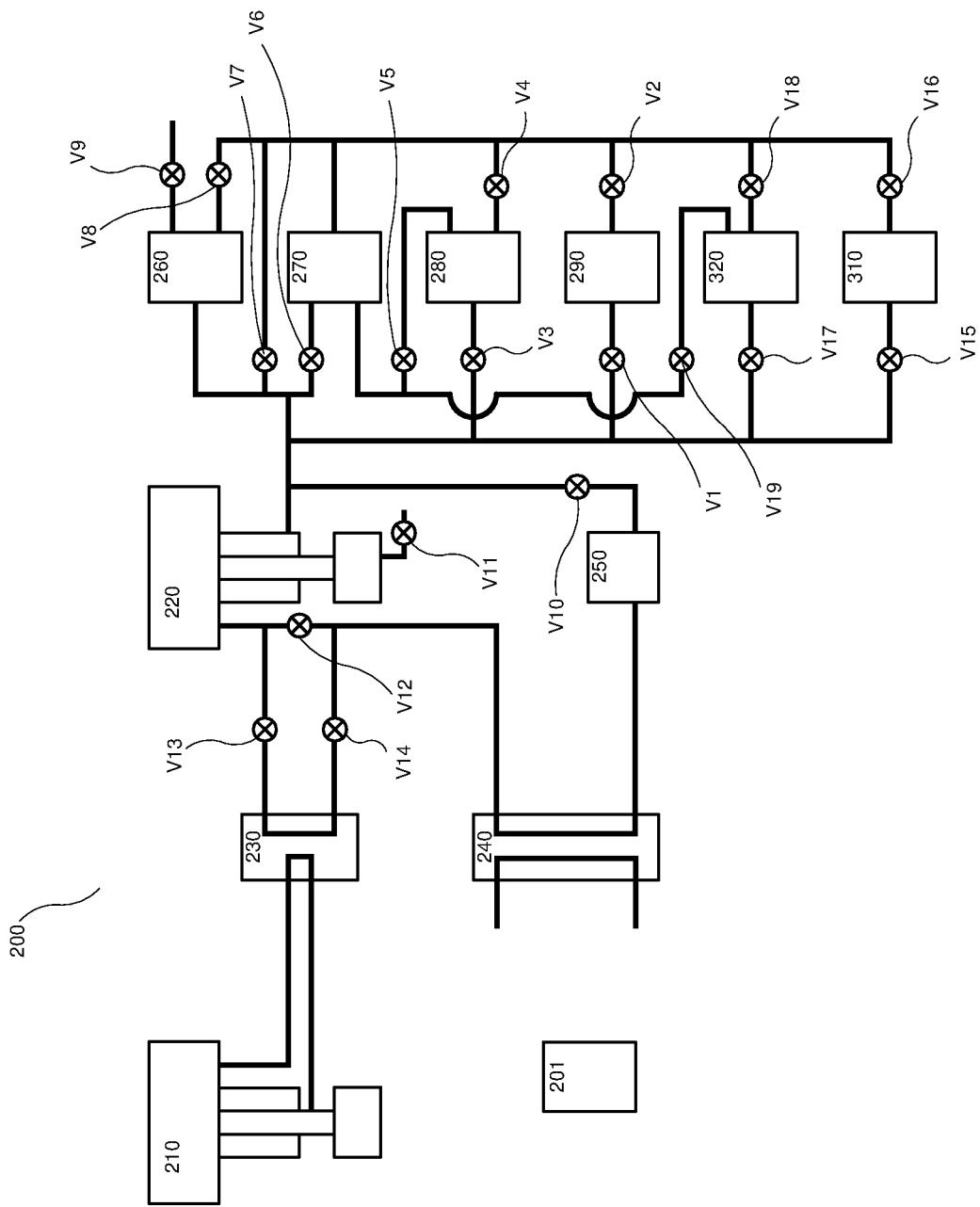
FIG. 2 is a schematic overview of a system according to the present invention.

Hence, FIGS. 1a and 1b illustrate a furnace 100 for producing direct reduced and carburized metal material. In FIG. 2, two such furnaces 210, 220 are illustrated. The furnaces 210, 220 may be identical to furnace 100, or differ in details. However, it is understood that everything which is said herein regarding the furnace 100 is equally applicable to furnaces 210 and/or 220, and vice versa.

Furthermore, it is understood that everything which is said herein regarding the present method is equally applicable to the present system 200 and/or furnace 100; 210, 220, and vice versa.

The furnace 100 as such has many similarities with the furnaces described in SE7406174-8 and SE7406175-5, and reference is made to these documents regarding possible design details. However, an important difference between these furnaces and the present furnace 100 is that the present furnace 100 is not arranged to be operated in a way where hydrogen gas is recirculated through the furnace 100 and back to a collecting container arranged outside of the furnace 100, and in particular not in a way where hydrogen gas is recirculated out from the furnace 100 (or heated furnace space 120) and then back into the furnace 100 (or heated furnace space 120) during one and the same batch processing of charged material to be reduced.

Instead, and as will be apparent from the below description, the furnace 100 is arranged for batch-wise reducing and carburizing operation of one charge of material at a time, and to operate during such an individual batch processing as a closed system, in the sense that hydrogen gas is supplied to the furnace 100 but not removed therefrom during the batchwise reducing and carburizing process; and that carbon-containing gas is supplied to the furnace 100 but not removed therefrom during the batchwise reducing and carburizing process.

This means that the amount of hydrogen gas present inside the furnace 100 always increases during the reduction process. After reduction has been completed, the hydrogen gas is of course evacuated from within the furnace 100, but there is no recirculation of hydrogen gas during the reduction step. In some embodiments, as will become clear in the following, the corresponding is true also for the carbon-containing gas.

Hence, the furnace 100 is part of a closed system comprising a heated furnace space 120 which is arranged to be pressurized, such as to a pressure of more than 1 bar, such as to a pressure of at least 1.5 bar, or at least 2 bar, or at least 3 bar, or at least 4 bar, or at least 5 bar, or even at least 6 bar. At any rate, the furnace space 120 is built to withstand the operating pressures described herein. An upper part 110 of the furnace 100 has a bell-shape. It can be opened for charging of material to be processed, and can be closed in a gas-tight manner using fastening means 111. The furnace space 120 is encapsulated with refractory material, such as brick material 130.

If nothing else is said, the term "pressure" herein refers to a total gas pressure, in particular inside the furnace space 120, in contrast to a "partial pressure" referring to the partial gas pressure of a particular gas.

Furthermore, since atmospheric pressure is about 1 bar, the expression "pressure of more than 1 bar" and "pressure above atmospheric pressure" is intended to have the same meaning. Correspondingly, the expression "pressure of less than 1 bar" and "pressure below atmospheric pressure" is intended to have the same meaning.

The furnace space 120 is arranged to be heated using one or several heating elements 121. Preferably, the heating elements 121 are electric heating elements. However, radiator combustion tubes or similar fuel-heated elements can be used as well. The heating elements 121 do not, however, produce any combustion gases that interact directly chemically with the furnace space 120, which must be kept chemically controlled for the present purposes. It is preferred that the only gaseous matter provided into the furnace space during the below-described main heating process is hydrogen gas and any carbon-containing gas used as a carbon source for carburizing the metal material.

The heating elements 121 may preferably be made of a heat-resistant metal material, such as a molybdenum alloy.

Additional heating elements may also be arranged in the heated furnace space 120. For instance, heating elements similar to elements 121 may be provided at the side walls of the furnace space 120, such as at a height corresponding to the charged material or at least to the container 140. Such heating elements may aid heating not only the gas, but also the charged material via heat radiation.

The furnace 100 also comprises a lower part 150, forming a sealed container together with the upper part 110 when the furnace is closed using fastening means 111.

A container 140 for material to be processed (reduced and carburized) is present in the lower part 150 of the furnace 100. The container 140 may be supported on a refractory floor of the furnace space 120 in a way allowing gas to pass beneath the container 140, such as along open or closed channels 172 formed in said floor, said channels 172 passing from an inlet 171 for hydrogen gas and carbon-containing gas, such as from a central part of the furnace space 120 at said furnace floor, radially outward to a radial periphery of the furnace space 120 and thereafter upwards to an upper part of the furnace space 120. See flow arrows indicated in FIG. 1a for these flows during the below-described initial step and main reduction and carburization step.

The container 140 is preferably of an open constitution, meaning that gas can pass freely through at least a bottom/floor of the container 140. This may be accomplished, for instance, by forming holes through the bottom of the container 140.

The material to be processed comprises a metal oxide, preferably an iron oxide such as $Fe_2O_3$ and/or $Fe_3O_4$. The material may be granular, such as in the form of pellets or balls. One suitable material to be charged for batch reduction is rolled iron ore balls, that have been rolled in water to a ball diameter of about 1-1.5 cm. If such iron ore additionally contains oxides that evaporate at temperatures below the final temperature of the charged material in the present method, such oxides may be condensed in the condenser 160 and easily collected in powder form. Such oxides may comprise metal oxides such as Zn and Pb oxides.

Advantageously, the furnace space 120 is not charged with very large amounts of material to be reduced. Each furnace 100 is preferably charged with at the most 50 tonnes, such as at the most 25 tonnes, such as between 5 and 10 tonnes, in each batch. This charge may be held in one single container 150 inside the furnace space 120. Depending on throughput requirements, several furnaces 100 may be used in parallel, and the residual heat from a batch in one furnace 220 can then be used to preheat another furnace 210 (see FIG. 2 and below).

This provides a system 200 which is suitable for installation and use directly at the mining site, requiring no expensive transport of the ore before reduction. Instead, direct reduced and carburized metal material can be produced on-site, packaged under a protecting atmosphere and transported to a different site for further processing.

Hence, in the case of water-rolled iron ore balls, it is foreseen that the furnace 100 may be installed in connection to the iron ore ball production system, so that charging of the metal material into the furnace 100 in the container 140 can take place in a fully automated manner, where containers 140 are automatically circulated from the iron ore ball production system to the system 100 and back, being filled with iron ore balls to be reduced and carburized; inserted into the furnace space 120; subjected to the reducing and carburizing hydrogen/heat/carbon-containing gas processing described herein; removed from the furnace space 120 and emptied; taken back to the iron ore ball production system; refilled; and so forth. More containers 140 may be used than furnaces 100, so that in each batch switch a reduced and carburized charge in a particular container is immediately replaced in the furnace 100 with a different container carrying material not yet reduced and carburized. Such a larger system, such as at a mining site, may be implemented to be completely automated, and also to be very flexible in terms of throughput, using several smaller furnaces 100 rather than one very large furnace.

Below the container 140, the furnace 100 comprises a gas-gas type heat exchanger 160, which may advantageously be a tube heat exchanger such as is known per se. The heat exchanger 160 is preferably a counter-flow type heat exchanger. To the heat exchanger 160, below the heat exchanger 160, is connected a closed trough 161 for collecting and accommodating condensed water from the heat exchanger 160. The trough 161 is also constructed to withstand the operating pressures of the furnace space 120 in a gas-tight manner.

The heat exchanger 160 is connected to the furnace space 120, preferably so that cool/cooled gases arriving to the furnace space 120 pass the heat exchanger 160 along externally/peripherally provided heat exchanger tubes and further through said channels 172 up to the heating element 121. Then, heated gases passing out from the furnace space 120, after passing and heating the charged material (see below), pass the heat exchanger 160 through internally/centrally provided heat exchanger tubes, thereby heating said cool/cooled gases. The outgoing gases hence heat the incoming gases both by thermal transfer due to the temperature difference between the two, as well as by the condensing heat of condensing water vapour contained in the outgoing gases effectively heating the incoming gases.

The formed condensed water from the outgoing gases is collected in the trough 161.

The furnace 100 may comprise a set of temperature and/or pressure sensors in the trough 161 (122); at the bottom of the furnace space 120, such as below the container 140 (123) and/or at the top of the furnace space 120 (124). These sensors may be used by control unit 201 to control the reduction and carburizing process, as will be described below.

171 denotes an entry conduit for heating/cooling gas. 173 denotes an exit conduit for used cooling gas.

Between the trough 161 and the entry conduit 171 there may be an overpressure equilibration channel 162, with a valve 163. In case a predetermined pressure difference, such as a pressure difference of at least 1 bar, builds up in the trough 161, due to large amounts of water flowing into the trough 161, such a pressure difference may then be partially or completely equalized by gas release to the entry conduit 171. The valve 163 may be a simple overpressure valve, arranged to be open when the pressure in trough 161 is higher than said predetermined pressure difference in relation to the pressure in the conduit 171. Alternatively, the valve may be operated by control device 201 (below) based on a measurement from pressure sensor 122.

Condensed water may be led from the condenser/heat exchanger 160 down into the trough via a spout 164 or similar, debouching at a bottom of the trough 161, such as at a local low point 165 of the trough, preferably so that an orifice of said spout 164 is arranged fully below a main bottom 166 of the trough 161 such as is illustrated in FIG. 1a. This will decrease liquid water turbulence in the trough 161, providing more controllable operation conditions.

The trough 161 is advantageously dimensioned to be able to receive and accommodate all water formed during the reduction of the charged material. The size of trough 161 can hence be adapted for the type and volume of one batch of reduced material. For instance, when fully reducing and 1000 kg of $Fe_3O_4$, 310 liters of water is formed as a result, and when fully reducing 1000 kg of $Fe_2O_3$, 338 liters of water is formed as a result.

In FIG. 2, a system 200 is illustrated in which a furnace of the type illustrated in FIGS. 1a and 1b may be put to use. In particular, one or both of furnaces 210 and 220 may be of the type illustrated in FIGS. 1a and 1b, or at least according to the present claim 1.

230 denotes a gas-gas type heat exchanger. 240 denotes a gas-water type heat exchanger. 250 denotes a fan. 260 denotes a vacuum pump. 270 denotes a compressor. 280 denotes a container for used hydrogen gas. 290 denotes a container for fresh/unused hydrogen gas. 310 denotes a container for fresh/unused carbon-containing gas. 320 denotes a container for used carbon-containing gas, such as a mixture of gas of the type stored in container 310 and hydrogen gas. V1-V19 denote valves.

201 denotes a control device, which is connected to sensors 122, 123, 124 and valves V1-V19, and which is generally arranged to control the processes described herein. The control device 201 may also be connected to a user control device, such as a graphical user interface presented by a computer (not shown) to a user of the system 200 for supervision and further control.

Figure 3:
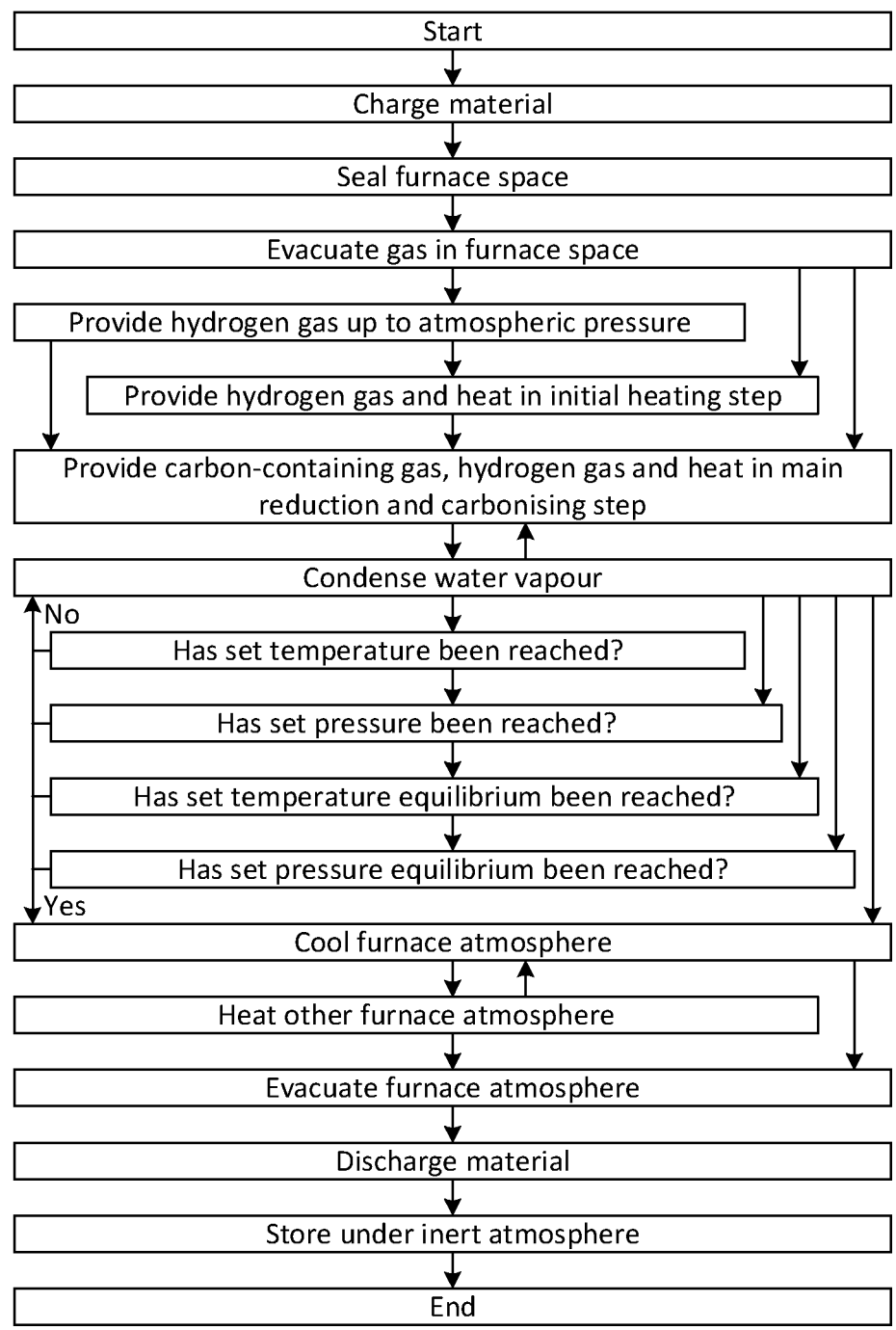
FIG. 3 is a flowchart of a method according to the present invention.

FIG. 3 illustrates a method according to the present invention, which method uses a system 100 of the type generally illustrated in FIG. 3 and in particular a furnace 100 of the type generally illustrated in FIGS. 1a and 1b. In particular, the method is for producing direct reduced and carburized metal material using hydrogen gas as the reducing agent and a carbon-containing gas as the carburizing carbon source.

After such direct reduction and carburizing, the metal material may form carburized sponge metal. In particular, the metal material may be iron oxide material, and the resulting product after the direct reduction may then be carburized sponge iron. The resulting reduced, carburized metal material may then be used, in subsequent method steps, to produce steel and so forth.

In a first step, the method starts.

In a subsequent step, the metal material to be reduced is charged into the furnace space 120. This charging may take place by a loaded container 140 being placed into the furnace space 120 in the orientation illustrated in FIGS. 1a and 1b, and the furnace space 120 may then be closed and sealed in a gas-tight manner using fastening means 111.

In a subsequent step, an existing atmosphere is evacuated from the furnace space 120, so that a gas pressure of less than 1 bar is achieved inside the furnace space 120. It is noted that this lower gas pressure is lower than atmospheric pressure. This may take place by valves 1-8, 11 and 13-19 being closed and valves 9-10 and 12 being open, and the vacuum pump sucking out and hence evacuating the contained atmosphere inside the furnace space 120 via the conduit passing via 240 and 250. Valve 9 may then be open to allow such evacuated gases to flow out into the surrounding atmosphere, in case the furnace space 120 is filled with air. If the furnace space 120 is filled with used hydrogen and/or carbon-containing gas, this is instead evacuated to the container 280 or 320, as the case may be.

In this example, the furnace atmosphere is evacuated via conduit 173, even if it is realized that any other suitable exit conduit arranged in the furnace 100 may be used.

In this evacuation step, as well as in other steps as described below, the control device 201 may be used to control the pressure in the furnace space 120, such as based upon readings from pressure sensors 122, 123 and/or 124.

The emptying may proceed until a pressure of at the most 0.5 bar, preferably at the most 0.3 bar, is achieved in the furnace space 120.

In a subsequent initial heating step, heat and hydrogen gas is provided to the furnace space 120. The hydrogen gas may be supplied from the containers 280 and/or 290. Since the furnace 100 is closed, as mentioned above, substantially none of the provided hydrogen gas will escape during the process. In other words, the hydrogen gas losses (apart from hydrogen consumed in the reduction reaction) will be very low or even non-existent. Instead, only the hydrogen consumed chemically in the reduction reaction during the reduction process will be used. Further, the only hydrogen gas which is required during the reduction process is the necessary amount to uphold the necessary pressure and chemical equilibrium between hydrogen gas and water vapour during the reduction process.

As mentioned above, the container 290 holds fresh (unused) hydrogen gas, while container 280 holds hydrogen gas that has already been used in one or several reduction steps and has since been collected in the system 200. The first time the reduction process is performed, only fresh hydrogen gas is used, provided from container 290. During subsequent reduction processes, reused hydrogen gas, from container 280 (or 320, see below), is used, which is topped up by fresh hydrogen gas from container 290 according to need.

During an optional initial phase of the initial heating step, which initial phase is one of hydrogen gas introduction, performed without any heat provision up to a furnace space 120 pressure of about 2 bar, valves 2, 4-9, 11 and 13-19 are closed, while valves 10 and 12 are open. Depending on if fresh or reused hydrogen gas is to be used, valve V1 and/or V3 is open.

As the pressure inside the furnace space 120 reaches, or comes close to, atmospheric pressure (about 1 bar), the heating element 121 is switched on. Preferably, it is the heating element 121 which provides the said heat to the furnace space 120, by heating the supplied hydrogen gas, which in turn heats the material in the container 140. Preferably, the heating element 121 is arranged at a location past which the hydrogen/carbon-containing gas being provided to the furnace space 120 flows, so that the heating element 121 will be substantially submerged in (completely or substantially completely surrounded by) newly provided hydrogen/carbon-containing gas during the reducing and carburization process. In other words, the heat may advantageously be provided directly to the hydrogen gas and/or directly to the carbon-containing gas, whichever is concurrently provided (in said initial or late steps) to the furnace space 120. In FIGS. 1a and 1b, the preferred case in which the heating element 121 is arranged in a top part of the furnace space 120 is shown.

However, the present inventor foresee that the heat may be provided in other ways to the furnace space 120, such as directly to the gas mixture inside the furnace space 120 at a location distant from where the provided hydrogen/carbon-containing gas enters the furnace space 120. In other examples, the heat may be provided to the provided hydrogen/carbon-containing gas as a location externally to the furnace space 120, before the thus heated hydrogen/carbon-containing gas is allowed to enter the furnace space 120.

During the rest of the said initial heating step, valves 5 and 7-19 are closed, while valves 1-4 and 6 are controlled by the control device, together with the compressor 270, to achieve a controlled provision of reused and/or fresh hydrogen gas as described in the following.

Hence, during this initial heating step, the control device 201 is arranged to control the heat and hydrogen provision means 121, 280, 290 to provide heat and hydrogen gas to the furnace space 120 in a way so that heated hydrogen gas heats the charged metal material to a temperature above the boiling temperature of water contained in the metal material. As a result, said contained water evaporates.

Throughout the initial heating step and the main reduction and carburizing step (see below), hydrogen gas is supplied slowly under the control of the control device 201. As a result, there will be a continuously present, relatively slow but steady, flow of hydrogen gas, vertically downwards, through the charged material. In general, the control device is arranged to continuously add hydrogen gas so as to maintain a desired increasing (such as monotonically increasing) hydrogen partial pressure curve (and also a total pressure curve) inside the furnace space 120, and in particular to counteract the decreased pressure at the lower parts of the furnace space 120 (and in the lower parts of the heat exchanger 160) resulting from the constant condensation of water vapour in the heat exchanger 160 (see below). The total energy consumption depends on the efficiency of the heat exchanger 160, and in particular its ability to transfer thermal energy to the incoming hydrogen gas from both the hot gas flowing through the heat exchanger 160 and the condensation heat of the condensing water vapour. In the exemplifying case of $Fe_2O_3$, the theoretical energy needed to heat the oxide, thermally compensate for the endothermic reaction and reduce the oxide is about 250 kWh per 1000 kg of $Fe_2O_3$. For $Fe_3O_4$, the corresponding number is about 260 kWh per 1000 kg of $Fe_3O_4$.

An important aspect of the present invention is that there is no recirculation of hydrogen gas during the reduction process. This has been discussed on a general level above, but in the example shown in FIG. 1a this means that the hydrogen gas is supplied, such as via compressor 270, through entry conduit 171 into the top part of the furnace space 121, where it is heated by the heating element 121 and then slowly passes downwards, past the metal material to be reduced in the container 140, further down through the heat exchanger 130 and into the trough 161. However, there are no available exit holes from the furnace space 120, and in particular not from the trough 161. The conduit 173 is closed, for instance by the valves V10, V12, V13, V14 being closed. Hence, the supplied hydrogen gas will be partly consumed in the reduction process, and partly result in an increased gas pressure in the furnace space 120. This process then goes on until a full or desired reduction has occurred of the metal material, as will be detailed below.

Hence, the heated hydrogen gas present in the furnace space 120 above the charged material in the container 140 will, via the slow supply of hydrogen gas forming a slowly moving downwards gas stream, be brought down to the charged material. There, it will form a gas mixture with water vapour from the charged material and any hitherto added carbon-containing gas (see below).

The resulting hot gas mixture will form a gas stream down into and through the heat exchanger 160. In the heat exchanger 160, there will then be a heat exchange of heat from the hot gas arriving from the furnace space 120 to the cold newly provided hydrogen/carbon-containing gas arriving from conduit 171, whereby the latter will be preheated by the former. In other words, hydrogen gas to be provided in the initial step, and also hydrogen and/or carbon-containing gas provided in the main reduction and carburization step (and/or the carbon-provision step, see below), is preheated in the heat exchanger 160.

Due to the cooling of the hot gas flow, water vapour contained in the cooled gas will condense. This condensation results in liquid water, which is collected in the trough 161, but also results in condensation heat. It is preferred that the heat exchanger 160 is further arranged to transfer such condensation thermal energy from the condensed water to the cold hydrogen/carbon-containing gas to be provided into the furnace space 120.

The condensation of the contained water vapour will also decrease the pressure of the hot gas flowing downwards from the furnace space 120, providing space for more hot gas to pass downwards through the heat exchanger 160.

Due to the slow supply of additional heated hydrogen gas, and to the relatively high thermal conductivity of hydrogen gas, the charged material will relatively quickly, such as within 10 minutes or less, reach the boiling point of liquid water contained in the charged material, which should by then be slightly above 100° C. As a result, this contained liquid water will evaporate, forming water vapour mixing with the hot hydrogen gas.

The condensation of the water vapour in the heat exchanger 160 will decrease the partial gas pressure for the water vapour at the lower end of the structure, making the water vapour generated in the charged material on average flow downwards. Adding to this effect, water vapour also a substantially lower density than the hydrogen gas with which it mixes.

This way, the water contents of the charged material in the container 140 will gradually evaporate, flow downwards through the heat exchanger 160, cool down and condense therein and to up in liquid state in the trough 161.

It is preferred that the cold hydrogen gas supplied to the heat exchanger 160, and also any carbon-containing gas supplied, is room tempered or has a temperature which is slightly less than room temperature.

It is realized that this initial heating step, in which the charged material is hence dried from any contained liquid water, is a preferred step in the present method. In particular, this makes it easy to produce and provide the charged material as a granular material, such as in the form of rolled balls of material, without having to introduce an expensive and complicating drying step prior to charging of the material into the furnace space 120.

However, it is realized that it would be possible to charge already dry or dried material into the furnace space 120. In this case, the initial heating step as described herein would not be performed, but the method would skip immediately to the main reduction and carburization step (below).

Moreover, some mechanisms of this initial heating step have been described above with reference both to added hydrogen gas and carbon-containing gas. These mechanisms are also present in the subsequent main reduction and carburization step (see below). However, in the initial heating step it is preferred that no carbon-containing gas is added. In particular, it is preferred that the only added gas during the initial heating step is hydrogen gas.

In one embodiment of the present invention, the provision of hydrogen gas to the furnace space 120 during said initial heating step is controlled to be so slow so that a pressure equilibrium is substantially maintained throughout the performance of the initial heating step, preferably so that a substantially equal pressure prevails throughout the furnace space 120 and the not liquid-filled parts of the trough 161 at all times. In particular, the supply of hydrogen gas may be controlled so that the said equilibrium gas pressure does not increase, or only increases insignificantly, during the initial heating step. In this case, the hydrogen gas supply is then controlled to increase the furnace space 120 pressure over time only after all or substantially all liquid water has evaporated from the charged material in the container 140. The point in time when this has occurred may, for instance, be determined as a change upwards in slope of a temperature-to-time curve as measured by temperature sensor 123 and/or 124, where the change of slope marks a point at which substantially all liquid water has evaporated but the reduction has not yet started. Alternatively, hydrogen gas supply may be controlled so as to increase the pressure once a measured temperature in the furnace space 120, as measured by temperature sensor 123 and/or 124, has exceeded a predetermined limit, which limit may be between 100° C. and 150° C., such as between 120° C. and 130° C.

In a subsequent main reduction and carburization step, heat and hydrogen gas is further provided to the furnace space 120, in a manner corresponding to the supply during the initial heating step described above, so that heated hydrogen gas heats the charged metal material to a temperature high enough in order for metal oxides present in the metal material to be reduced, in turn causing water vapour to be formed.

During this main reduction and carburization step, additional hydrogen gas is hence supplied and heated, under a gradual pressure increase inside the furnace space 120, so that the charged metal material in turn is heated up to a temperature at which a reduction chemical reaction is initiated and maintained.

In the example illustrated in FIGS. 1a and 1b, the topmost charged material will hence be heated first. In the case of iron oxide material, the hydrogen gas will start reducing the charged material to form metallic iron at about 350-400° C., forming pyrophytic iron and water vapour according to the following formulae:

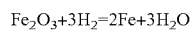

$$Fe_2O_3+3H_2=2Fe+3H_2O$$

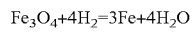

$$Fe_3O_4+4H_2=3Fe+4H_2O$$

This reaction is endothermal, and is driven by the thermal energy supplied via the hot hydrogen gas flowing down from above in the furnace space 120.

Hence, during both the initial heating step and the main reduction and carburization step, water vapour is produced in the charged material. This formed water vapour is continuously condensed and collected in a condenser arranged below the charged metal material. In the example shown in FIG. 1a, the condenser is in the form of the heat exchanger 160.

According to the invention, the main reduction and carburization step, including said condensing, is performed so that a pressure of more than 1 bar is built up in the furnace space 120 in relation to atmospheric pressure. In particular, the hydrogen gas is provided so that said pressure of more than 1 bar is achieved and maintained. It is noted that such a pressure of more than 1 bar is a pressure which is higher than atmospheric pressure.

Further according to the invention, the method further comprises a carbon-provision step, namely a step in which a carbon-containing gas is provided to the furnace space 120, so that the metal material that has been heated by said supplied heat and reduced by reaction with said hydrogen gas is carburized by said carbon-containing gas. This provision of carbon-containing gas is performed as a part of said main reduction and carburizing step, and is performed before an evacuation of gases from the furnace space 120 back to atmospheric pressure in the furnace space 120. Such evacuation may be performed as a step of the present method, as will be explained below, performed for instance as a part of a material cooling substep.

The carbon-containing gas may be any carbon-containing gas which can chemically react with the reduced metal material so as to carburize the latter. Examples of suitable carbon-containing gases comprise various gaseous (at the temperatures and pressures prevailing in the furnace space 120 during the performance of the present method) hydrocarbons, such as methane, ethane, propane, propene and similar. Preferably, the carbon-containing gas does not contain more than trace amounts of carbon monoxide, since this will efficiently prevent both carbon monoxide and carbon dioxide from forming residual products after the finalization of the present carburization process. In particular, it is preferred that no carbon monoxide is supplied to the furnace space 120 in said carbon-provision step.

As will be described and exemplified below, the carbon-provision step may be performed at least partly at the same time as the provision of hydrogen gas and heat described above. In particular, the carbon-provision step may be performed as a part of said main reduction and carburization step.

As described above, during reduction of iron free iron (Fe) is formed, which is then open for receiving carbon (C) to form $Fe_3C$.

Figure 5:
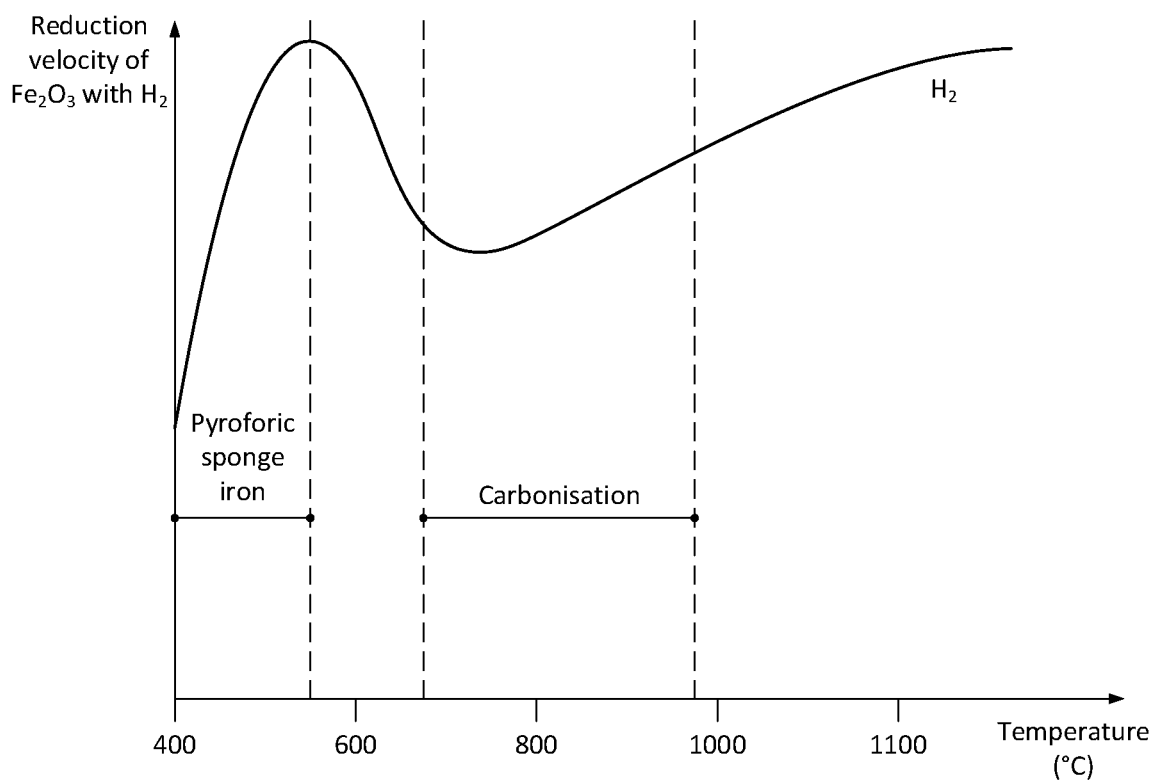
FIG. 5 is a chart showing the reductivity of $H_2$ with respect to a metal material to be reduced, as a function of temperature.

FIG. 5 illustrates the ability for $H_2$ to reduce $Fe_2O_3$ as function of increasing temperature. As is hinted FIG. 5, reduction using hydrogen gas is particularly active in the temperature interval of roughly 400°-700°.

Correspondingly, carburization of the same $Fe_2O_3$ using a gaseous carbon source is most active in an interval stretching roughly between 650°-900°.

$Fe_3O_4$, for instance, displays similar properties with respect to reduction/carburization and temperature.

This means that a process that first performs most of the reduction of metal material at relatively lower temperatures, and then, after additional heating, performs most of the carburization of the the metal material, will be efficient.

It is also the case that the carburization process is aided by the presence of water vapour, which as it turns out is present due to the reduction process of the same metal material.

In the particular case of methane as the carbon-containing gas and hematite/magnetite as the metal material, the following carburizing chemical reactions accrue in the furnace space:

$$Fe_3O_4 + 4H_2 = 3Fe + 4H_2O$$

$$3Fe + CH_4 = Fe_3C + 2H_2$$

The reaction between $CH_4$ and Fe comprises a sub reaction in which methane reacts with the water vapour formed by the reducing hydrogen gas:

$$CH_4 + H_2O = 2CO + 3H_2$$

Then, the carburization per se takes place mainly via the well-known hydrogen-water reaction, in which carbon monoxide and hydrogen react with the formed iron surface, and form water vapour, while the freed carbon atom can be taken up at the location for the previously freed oxygen atom.

Since the surface of the reduced iron is porous due to the reduction, the total iron surface area will typically be very large, leading to an efficient carburization process, in particular when the metal material is provided as a granular material.

As can be seen from the above formulas, a certain amount of hydrogen gas is formed by the carburization process, why less hydrogen gas is required than what would have otherwise been the case.

It is preferred that the finally carburized metal material, after the finishing of the carbon-provision step, has a carbon content of between 1%-4% by weight.

The supply of hydrogen gas in the main reduction and carburization step may preferably be maintained until a predetermined hydrogen partial pressure, or a predetermined total pressure being higher than 1 bar, has been reached inside the furnace space 120. In a corresponding manner, the provision of carbon-containing gas in the carbon-provision step may be performed until a predetermined partial pressure, or a predetermined total pressure being higher than 1 bar, has been reached inside the furnace space 120.

The pressure inside the furnace space 120 may, for instance, be measured by pressure sensor 123 and/or 124. As mentioned above, according to the invention no hydrogen gas is evacuated from the furnace space 120 until said pressure of more than 1 bar has been reached, and preferably no hydrogen gas is evacuated from the furnace space 120 until the main reduction and carburization step has been completely finalized. Correspondingly, it is preferred that no carbon-containing gas is evacuated from the furnace space 120 until said pressure of more than 1 bar has been reached, and preferably no carbon-containing gas is evacuated from the furnace space 120 until the main reduction and carburization step has been completely finalized.

In some embodiments, the provision of hydrogen gas is performed at least until a hydrogen partial pressure of more than 1 bar has been reached inside the furnace space 120, while no hydrogen gas is evacuated from the furnace space 120 until said hydrogen gas partial pressure of more than 1 bar has been reached.

In particular, the supply of hydrogen gas in the main reduction and carburization step, and the condensing of water vapour, may be performed until a predetermined pressure being higher than 1 bar has been reached in the furnace space 120, which predetermined pressure is at least 2.3 bar, more preferably at least 2.5 bar, or even about 3 bar or more. The corresponding is true for a possible pressure-regulating provision of carbon-containing gas in the carbon-provision step.

It is noted that the method may be designed so that no evacuation of hydrogen or carbon-containing gas is performed until this predetermined pressure has been reached.

Alternatively, the supply of hydrogen gas in the main reduction and carburization step, and the condensing of water vapour, may be performed until a steady state has been reached, in terms of it no longer being necessary to provide more hydrogen gas in order to maintain a reached steady state gas pressure inside the furnace space 120. This pressure may be measured in the corresponding way as described above. Preferably, the steady state gas pressure may be at least 2.3 bar, more preferably at least 2.5 bar, or even about 3 bar or more. This way, a simple way of knowing when the reduction process has been completed is achieved.

Further alternatively, the supply of hydrogen gas and heat in the main reduction and carburization step, and the condensing of water vapour, may be performed until the charged metal material to be reduced has reached a predetermined temperature, which may be at least 600° C., such as between 640-680° C., preferably about 660° C. The temperature of the charged material may be measured directly, for instance by measuring heat radiation from the charged material using as suitable sensor, or indirectly by temperature sensor 123.

In some embodiments, the main reduction and carburization step, including said condensation of the formed water vapour, is performed during a continuous time period of at least 0.25 hours, such as at least 0.5 hours, such as at least 1 hour. During this whole time, both the pressure and temperature of the furnace space 120 may increase monotonically.

In some embodiments, the main reduction and carburization step may furthermore be performed iteratively, in each iteration the control device 201 allowing a steady state pressure to be reached inside the furnace space 120 before supplying an additional amount of hydrogen gas into the furnace space. The heat provision may also be iterative (pulsed), or be in a switched on state during the entire main reduction and carburization step.

It is noted that, during the performing of both the initial heating step and the main reduction and carburization steps, and in particular at least during substantially the entire length of these steps, there is a net flow downwards of water vapour through the charged metal material in the container 140.

During the initial step and the main reducing and carburization step, with the possible exception of a time period in connection to the start of the carbon-provision step, in which the total furnace space 120 pressure may be decreased, the compressor 270 may be controlled, by the control device 201, to, at all times, maintain or increase the pressure by supplying additional hydrogen gas and/or carbon-containing gas. Supplied hydrogen gas is used to compensate for hydrogen consumed in the reduction process, and also to gradually increase the pressure to a desired final pressure. Carbon-containing gas can be supplied using any one of a number of different strategies (as explained below), and may for instance be controlled so as to achieve a set target total pressure in the furnace space 120 during such provision.

The formation of water vapour in the charged material increases the gas pressure locally, in effect creating a pressure variation between the furnace space 120 and the trough 161. As a result, formed water vapour will sink down through the charged material and condense in the heat exchanger 160, in turn lowering the pressure on the distant (in relation to the furnace space 120) side of the heat exchanger 160. These processes thus create a downwards net movement of gas through the charge, where newly added hydrogen gas compensates for the pressure loss in the furnace space 120.

The thermal content in the gas flowing out from the furnace space 120, and in particular the condensing heat of the water vapour, is transferred to the incoming hydrogen/carbon-containing gas in the heat exchanger 160.

Hence, the reduction process is maintained as long as there is metal material to reduce and water vapour hence is produced, resulting in said downwards gas movement. Once the production of water vapour stops (due to substantially all metal material having been reduced), the pressure equalizes throughout the interior of the furnace 100, and the measured temperature will be similar throughout the furnace space 120, in case no additional carbon-containing gas is supplied. For instance, a measured pressure difference between a point in the gas-filled part of the trough 161 and a point above the charged material will be less than a predetermined amount, which may be at the most 0.1 bar. Additionally or alternatively, a measured temperature difference between a point above the charged material and a point below the charged material but on the furnace space 120 side of the heat exchanger will be less than a predetermined amount, which may be at the most 20° C. Hence, when such pressure and/or temperature homogeneity is reached and measured, the hydrogen gas supply may be stopped by the hydrogen gas supply being shut off.

Normally, the heating element 121 is not switched off until the carburization has finished, which will normally occur at a later point in time.

Hence, the supply of the combination of hydrogen gas and heat in the main reduction and carburization step may be performed until a predetermined minimum temperature and/or (over)pressure has been reached, and/or until a predetermined maximum temperature difference and/or maximum pressure difference has been reached in the heated volume in the furnace 100. Which criterion(s) is/are used depends on the prerequisites, such as the design of the furnace 100 and the type of metal material to be reduced. For instance, a supply of heat may be performed until a predetermined minimum temperature has been reached, while the supply of hydrogen gas may be performed until temperature homogeneity has been reached. In another example, the provision of the combination of heat and hydrogen gas can be performed until a steady pressure state has been reached without any more supply of hydrogen gas being necessary.

It is also possible to use other criteria, such as a predetermined main heating time or the finalization of a predetermined heating/hydrogen supply program, which in turn may be determined empirically.

Said carbon-containing gas may be supplied using one of several different strategies.

FIRST EXAMPLE

In a first such strategy, the reduction using hydrogen gas is directly followed by carburization of the metal material. Firstly, hydrogen gas and heat are supplied as described above, to slowly increase the temperature and pressure in the furnace space 120 as the metal material is reduced. The final pressure may be as described above, for instance at least 1.1 bar, and preferably at least between 2.3-2.5 bar.

In this and other examples, when the reduction of the complete metal material charge has finished, the furnace space 120 has reached a temperature of about 700° C., and the temperature of the hydrogen gas going into the furnace space has the same temperature as the gas entering the heat exchanger 160.

Generally in this first strategy, heat may be provided in said main reduction and carburization step until the metal material reaches a temperature of at least 500° C., such as at least 600° C., before the provision of the carbon-containing gas starts in said carbon-provision step.

At this state, when the reduction is complete, no carbon-containing gas has been supplied yet. Before doing so, or in connection to doing so, part of the hydrogen gas may be evacuated so as to lower the partial hydrogen gas pressure. Namely, valve V4 may be closed to terminate hydrogen gas supply. Then, the compressor 270 may be used to evacuate some of the hydrogen gas, by closing valve V6 and opening valves V7 and V5 to the storage container 280 for used hydrogen. When the pressure has been lowered, to a lower pressure of between 1.1 and 1.8 bar, such as between 1.3 and 1.6 bar, such as about 1.5 bar, valves V7 and V5 are closed and the carbon-provision step starts.

Figure 4A:
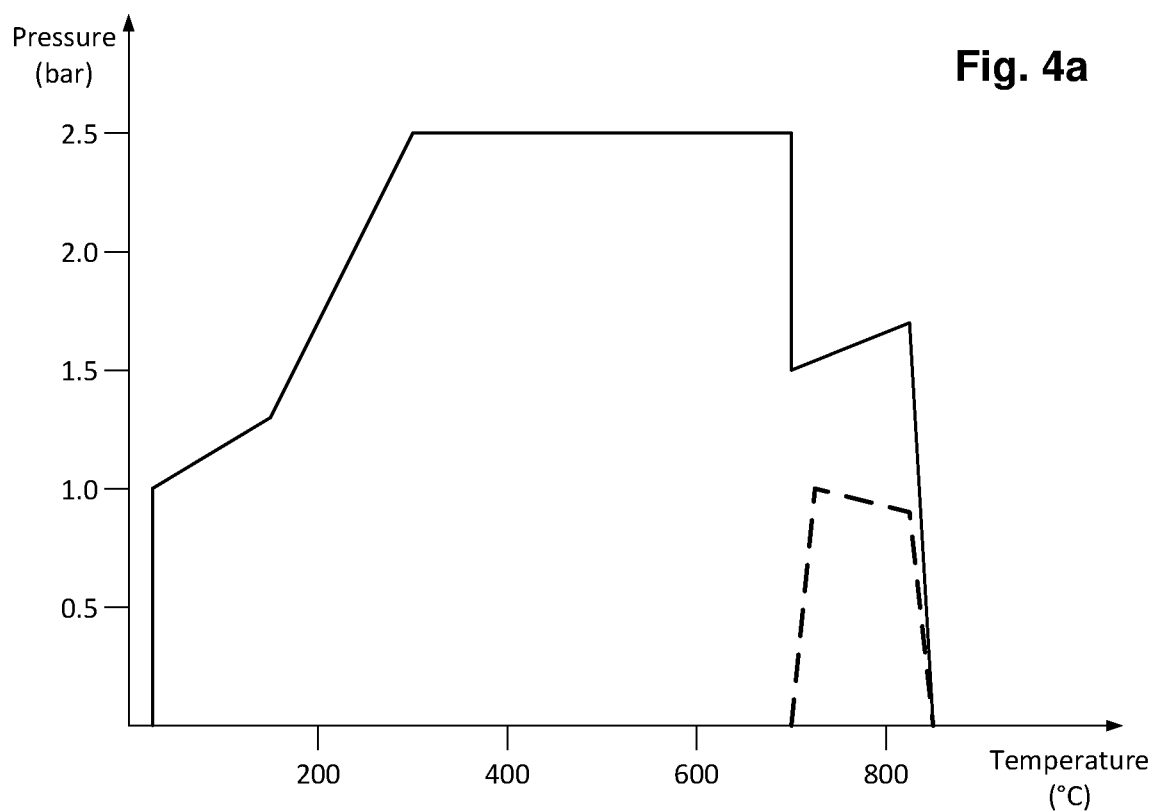
FIG. 4a is a schematic chart showing a possible relation between $H_2$ partial pressure, carburizing gas partial pressure and temperature in a heated furnace space according to a first embodiment of the present invention.

As is illustrated in FIG. 4a, after this partial hydrogen gas evacuation the total pressure in the furnace space 120 is about 1.5 in this example.

In general, the carbon-provision step may be at least partly, preferably completely, performed at a furnace space 120 pressure which is lower than a furnace space 120 pressure prevailing at the time for finalizing the reduction process.

In storage container 310, fresh carbohydrate gas, for instance methane, is stored, and in container 320 previously used carbohydrate gas (such as a mixture of methane and hydrogen) is stored. During the first use for carburizing, valve V15 is opened, if not valve V17 is opened, in case the pressure in container 320 is larger than that prevailing in the furnace space 120. Otherwise, valves V18 and V6 are opened so that the compressor 270 can press the amount of hydrocarbon needed to maintain the pressure in the furnace space 120 so as to perform the carburization.

At this point, the newly reduced metal material can accept the provided carbon. The carburization takes place under increased furnace space 120 temperature, via heating using heating element 121. Depending on the metal material constitution, the carburization is finished when the temperature has reached about 700° C.-1100° C. As mentioned above, during the carburization a certain amount of hydrogen is formed as a result.

Thereafter, the below-described cooling and emptying steps can be started.

FIG. 4a illustrates, in a schematic chart, a process according to this first strategy, in which the carbon-containing gas is added after the reduction is completed. The chart illustrates hydrogen gas partial pressure (full line) as a function of furnace space (120) temperature, and also carbon-containing gas partial pressure (broken line) as a function of furnace space (120) temperature, during the process.

Figure 4B:
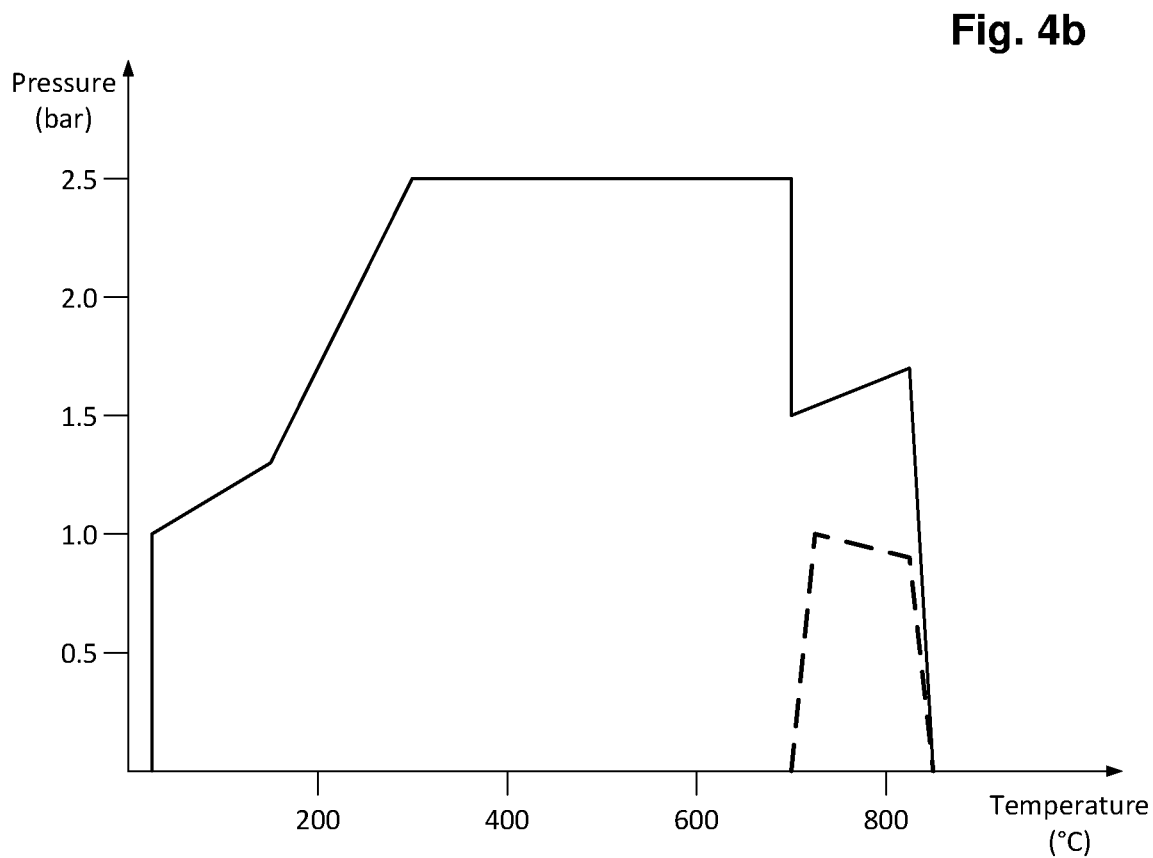
FIG. 4b is a schematic chart showing a possible relation between $H_2$ partial pressure, carburizing gas partial pressure and temperature in a heated furnace space according to a second embodiment of the present invention.
Figure 4C:
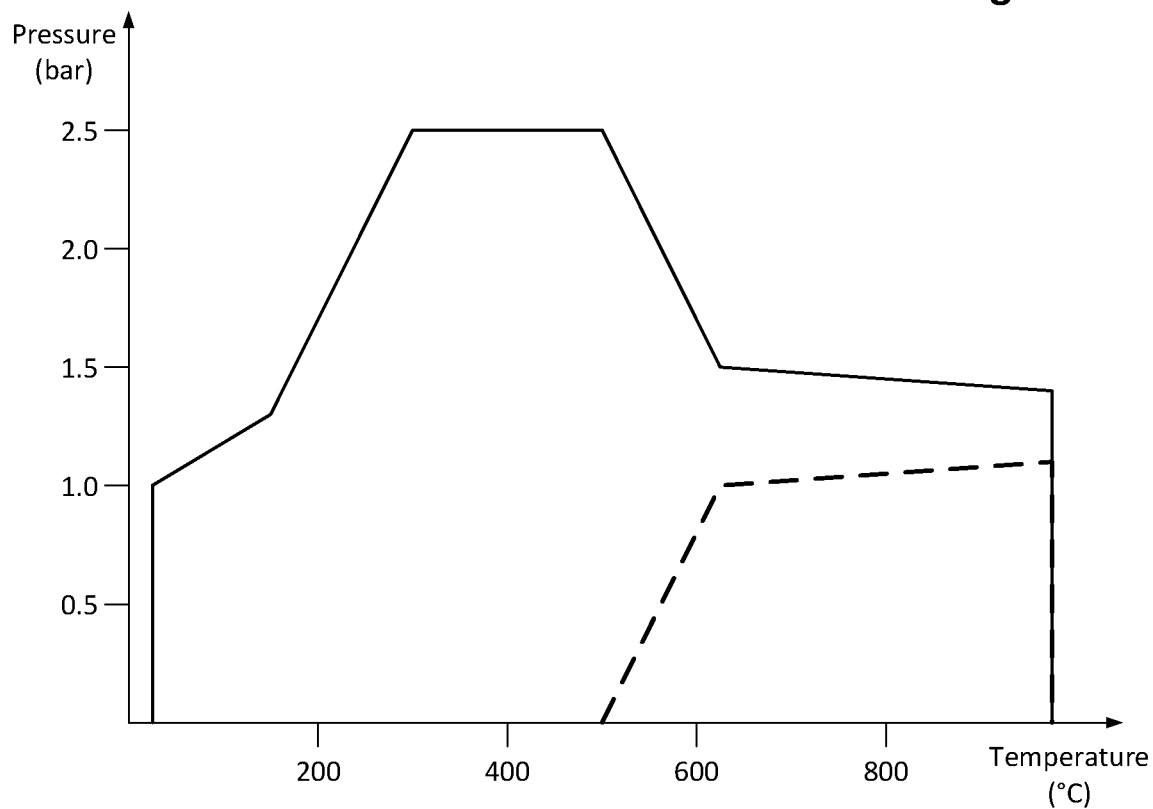
FIG. 4c is a schematic chart showing a possible relation between $H_2$ partial pressure, carburizing gas partial pressure and temperature in a heated furnace space according to a third embodiment of the present invention.

It is noted that FIG. 4a, as is the case also with FIGS. 4b and 4c, are simplified in the sense that they ignore any residual gas present in the furnace space 120 after the initial evacuation.

SECOND EXAMPLE

In a second strategy, the carbon-containing gas is supplied before the reduction is completed.

During the heating and the commencing reduction, hydrogen gas is supplied so as to achieve an increasing total furnace space 120 pressure of at least 1.1 bar, and preferably at least 2.3 bar. In this case, the carbon-containing gas is supplied shortly after the reduction has started, in other words after the temperature in the furnace space 120 has reached at least 350° C., such as between 350-450° C., such as at about 400° C. In general in this second strategy, the carbon-provision step only starts after the metal material has reached a temperature of between 350-450° C.

The provision of the carbon-containing gas then takes place by valve V1 or V3 being closed and V15 being opened (in case this is the first reduction), otherwise valve V17 is opened. As a result, the furnace space 120 starts to fill with carbon-containing gas. This means that the reduction and the carburization take place in parallel during the main reduction and carburization step, and the pressure is maintained by the supplied carbon-containing gas. In case the pressure in container 320 is not enough to supply the carbon-containing gas, valves V18 and V6 are instead opened, and valves V12, V13 and V14 are closed, so that the compressor 270 can slowly start to bring more carbon-containing gas and thereby maintain the pressure in the furnace space 120 at the desired final pressure of at least 2.3-3.5 bar.

During the whole reduction process, both heat and more carbon-containing gas until the reduction approaches finality, which takes place at about 700° C. at which temperature the gas exiting the charge has the same temperature as the gas entering the charge. At this point, the temperature is increased to a final temperature of more than 700° C. and preferably at the most 1100° C. while the pressure is being maintained by a continuous supply of mixed gas from the container 320, containing a mixture of hydrogen gas and carbon-containing gas.

Thereafter, the below-described cooling and emptying steps can be started.

FIG. 4b is a chart corresponding to the one shown in FIG. 4a, but illustrating this second strategy.

THIRD EXAMPLE

In a third strategy, the supply of carbon-containing gas starts as the reduction reaches its maximum. For hematite and magnetite, this occurs at about 550-570° C.

In this strategy, the pressure is increased to at least 1.1 bar, preferably to at least 2.3-2.5 bar by supply of hydrogen gas from container 290 as described above, via valve V1 or by opening valves V2/V6 and using the compressor 270, depending on an available hydrogen gas pressure in container 290. At the same time, heat is supplied to the furnace space 120 as described above.

As the temperature of the gases exiting the charge approaches 500° C., the supply of hydrogen gas is shut off. At this point, a major part of the charge will already have been fully reduced, and now consist of pyrophoric iron which is ready to receive carbon supplied via the carbon-containing gas. This is achieved by controlling valves V1-V4 for hydrogen gas and by opening valve V15 for fresh carbon-containing gas from container 310.

In case the pressure in container 310 is not sufficient, valves V15 and V1 are closed while valve V6 is opened, and the compressor 270 is used to maintain the desired pressure. Carburization takes place after or partly in parallel to the reduction, and the pressure is maintained by supply of the carbon-containing gas. As mentioned above, a certain amount of hydrogen gas is formed as a result of the carburization, and an unwanted resulting pressure increase can be handled by evacuating part of the furnace space 120 atmosphere to container 320 by opening valves V7 and V19, and allowing the compressor 270 to press the hydrogen/carbon-containing gas mixture from the furnace space 120 to container 320.

When the temperature at the exit side of the charge is the same as on the entry side, preferably between 650-750° C., such as between 690-700° C., the temperature is increased under constant pressure, more precisely a pressure of at least 1.1, preferably to at least 2.3-2.5 bar, to a higher temperature, which is at least 800° C., such as 800-1100° C. The constant pressure is maintained by supply of carbon-containing gas, preferably fresh carbon-containing gas from container 310 via valve V15, or via valves V16 and V6 using the compressor 270 if necessary.

Thereafter, the below-described cooling and emptying steps can be started.

In general in this third strategy, the carbon-provision step only starts after the metal material has reached a temperature of between 450-550° C., and the provision of hydrogen gas may thereafter be terminated. On the other hand, the carbon-provision step may then also comprise continuing to provide heat to the furnace space 120.

Furthermore, in general in this third strategy, heat is provided in the main reduction and carburization step, and in particular during the carbon-provision step, until the metal material reaches a temperature of between 700-1100° C., such as between 800-1100° C.

As mentioned, the carbon-provision step in this third strategy may comprise providing heat to the furnace space 120 at a constant pressure, which pressure is controlled by a controlled supply of carbon-containing gas, and which provided carbon-containing may or may not be mixed with hydrogen gas.

FIG. 4c is a chart corresponding to the one shown in FIG. 4a, but illustrating this third strategy. It is particularly noted that the partial pressure of hydrogen gas decreases above 600° C., which is because of hydrogen formed by the carburization reaction.

After full reduction and carburization has occurred, the method according to the present invention comprises a cooling and emptying step, that will be described in the following.

Hence, in a subsequent cooling step, the hydrogen gas/carbon-containing gas atmosphere in the furnace space 120 is then cooled to a temperature of at the most 100° C., preferably about 50° C., and is thereafter evacuated from the furnace space 120 and collected.

In the case of a single furnace 100/220, which is not connected to one or several furnaces, the charged material may be cooled using the fan 250, which is arranged downstream of the gas-water type cooler 240, in turn being arranged to cool the hydrogen/carbon-containing gas (circulated in a closed loop by the fan 250 in a loop past the valve V12, the heat exchanger 240, the fan 250 and the valve V10, exiting the furnace space 120 via exit conduit 173 and again entering the furnace space 120 via entry conduit 171). This cooling circulation is shown by the arrows in FIG. 1b.

The heat exchanger 240 hence transfers the thermal energy from the circulated hydrogen/carbon-containing gas to water (or a different liquid), from where the thermal energy can be put to use in a suitable manner, for instance in a district heating system. The closed loop is achieved by closing all valves V1-V19 except valves V10 and V12.

Since the hydrogen/carbon-containing gas in this case is circulated past the charged material in the container 140, it absorbs thermal energy from the charged material, providing efficient cooling of the charged material while the hydrogen/carbon-containing gas is circulated in a closed loop.

In a different example, the thermal energy available from the cooling of the furnace 100/220 is used to preheat a different furnace 210. This is then achieved by the control device 201, as compared to the above described cooling closed loop, closing the valve V12 and instead opening valves V13, V14. This way, the hot hydrogen/carbon-containing gas arriving from the furnace 220 is taken to the gas-gas type heat exchanger 230, which is preferably a counter-flow heat exchanger, in which hydrogen gas being supplied in an initial or main reduction and carburization step performed in relation to the other furnace 210 is preheated in the heat exchanger 230. Thereafter, the somewhat cooled hydrogen/carbon-containing gas from furnace 220 may be circulated past the heat exchanger 240 for further cooling before being reintroduced into the furnace 220. Again, the hydrogen/carbon-containing gas from furnace 220 is circulated in a closed loop using the fan 250.

Hence, the cooling of the hydrogen/carbon-containing gas in the cooling step may take place via heat exchange with hydrogen gas to be supplied to a different furnace 210 space 120 for performing the initial and main heating steps and the condensation, as described above, in relation to said different furnace 210 space 120.

Once the hydrogen/carbon-containing gas is insufficiently hot to heat the hydrogen gas supplied to furnace 210, the control device 201 again closes valves V13, V14 and reopens valve V12, so that the hydrogen/carbon-containing gas from furnace 220 is taken directly to heat exchanger 240.

Irrespectively of how its thermal energy is taken care of, the hydrogen/carbon-containing gas from furnace 220 is cooled until it (or, more importantly, the charged material) reaches a temperature of below 100° C., in order to avoid reoxidation of the charged material when later being exposed to air. The temperature of the charged material can be measured directly, in a suitable manner such as the one described above, or indirectly, by measuring in a suitable manner the temperature of the hydrogen/carbon-containing gas leaving via exit conduit 173.

The cooling of the hydrogen/carbon-containing gas may take place while maintaining the pressure of the hydrogen/carbon-containing gas, or the pressure of the hydrogen/carbon-containing gas may be lowered as a result of the hot hydrogen/carbon-containing gas being allowed to occupy a larger volume (of the closed loop conduits and heat exchangers) once valves V10 and V12 are opened.

In a subsequent step, the hydrogen/carbon-containing gas is evacuated from the furnace 220 space 120, and collected in a suitable container for used gas. Normally, the furnace space 120 will at this point contain a mixture of hydrogen and carbon-containing gas, and this mixture is then evacuated to the container 320 for used carbon-containing gas, using the vacuum pump 260, possibly in combination with the compressor 270. The control device opens valves V13, V14, V8 and V19, closes valves V1-V7 and V15-V18. Then, the vacuum pump 260 and the compressor 270 are operated to press the used gas mixture into container 320. The evacuation of the furnace space 120 is preferably performed until a pressure of at the most 0.5 bar, or even at the most 0.3 bar, is detected inside the furnace space 120.

Since the furnace space 120 is closed, only the hydrogen/carbon-containing gas consumed in the chemical reduction reaction has been removed from the system, and the remaining hydrogen gas is the one which was necessary to maintain the hydrogen gas/water vapour balance in the furnace space 120 during the main reduction and carburization step. This evacuated hydrogen gas is fully useful for a subsequent batch operation of a new charge of metal material to be reduced.

Thereafter, valves V7, V8, V19 are closed an and valve V9 is opened to allow air into the system for change of the charged material, and valve V11 is opened for emptying of the condensate water.

In a subsequent step, the furnace space 120 is opened, such as by releasing the fastening means 111 and opening the upper part 110. The container 140 is removed and is replaced with a container with a new batch of charged metal material to be reduced.

In a subsequent step, the removed, reduced material may then be arranged under an inert atmosphere, such as a nitrogen atmosphere, in order to avoid reoxidation during transport and storage.

For instance, the reduced metal material may be arranged in a flexible or rigid transport container which is filled with inert gas. Several such flexible or rigid containers may be arranged in a transport container, which may then be filled with inert gas in the space surrounding the flexible or rigid containers. Thereafter, the reduced metal material can be transported safely without running the risk of reoxidation.

The following table shows the approximate equilibrium between hydrogen gas $H_2$ and water vapour $H_2O$ for different temperatures inside the furnace space 120:

| Temperature (° C.): | 400 | 450 | 500 | 550 | 600 |
|---|---|---|---|---|---|
| $H_2$ (vol-%): | 95 | 87 | 82 | 78 | 76 |
| $H_2O$ (vol-%): | 5 | 13 | 18 | 22 | 24 |

About 417 Nm³ hydrogen gas $H_2$ is required to reduce 1000 kg of $Fe_2O_3$, and about 383 m³ hydrogen gas $H_2$ is required to reduce 1000 kg of $Fe_3O_4$.

The following table shows the amount of hydrogen gas required to reduce 1000 kg of $Fe_2O_3$ and $Fe_3O_4$, respectively, at atmospheric pressure and in an open system (according to the prior art), but at different temperatures:

| Temperature (° C.): | 400 | 450 | 500 | 550 | 600 |
|---|---|---|---|---|---|
| Nm³ $H_2$/tonne $Fe_2O_3$: | 8340 | 3208 | 2317 | 1895 | 1738 |
| Nm³ $H_2$/tonne $Fe_3O_4$: | 7660 | 2946 | 2128 | 1741 | 1596 |

The following table shows the amount of hydrogen gas required to reduce 1000 kg of $Fe_2O_3$ and $Fe_3O_4$, respectively, at different pressures and for different temperatures:

| Temperature (° C.): | 400 | 450 | 500 | 550 | 600 |
|---|---|---|---|---|---|
| Nm³ $H_2$/tonne $Fe_2O_3$: | | | | | |
| 1 bar | 8340 | 3208 | 2317 | 1895 | 1738 |
| 2 bar | 4170 | 1604 | 1158 | 948 | 869 |
| 3 bar | 2780 | 1069 | 772 | 632 | 579 |
| Nm³ $H_2$/tonne $Fe_3O_4$: | | | | | |
| 1 bar | 7660 | 2946 | 2128 | 1741 | 1596 |
| 2 bar | 3830 | 1473 | 1064 | 870 | 798 |
| 3 bar | 2553 | 982 | 709 | 580 | 532 |

As described above, the main reduction and carburization step according to the present invention is preferably performed up to a pressure of more than 1 bar and a high temperature. During the majority of a part of the main reduction and carburization step in which part reduction is ongoing, it has been found advantageous to use a combination of a heated hydrogen gas temperature of at least 500° C. and a furnace space 120 pressure of at least 2.3 bar.

Above, preferred embodiments have been described. However, it is apparent to the skilled person that many modifications can be made to the disclosed embodiments without departing from the basic idea of the invention.

For instance, the geometry of the furnace 100 may differ, depending on the detailed prerequisites.

The heat exchanger 160 is described as a tube heat exchanger. Even if this has been found to be particularly advantageous, it is realized that other types of gas-gas heat exchangers/condensers are possible. Heat exchanger 240 may be of any suitable configuration.

The surplus heat from the cooled hydrogen/carbon-containing gas may also be used in other processes requiring thermal energy.

The metal material to be reduced and carburized has been described as iron oxides. However, the present method and system can also be used to reduce and carburize metal material such as the above mentioned metal oxides containing Zn and Pb, that evaporate at temperatures below about 600-700° C.

The present combined direct reduction and carburizing principles can also be used with metal materials having higher reduction temperatures than iron ore, with suitable adjustments to the construction of the furnace 100, such as with respect to used construction materials.

Hence, the invention is not limited to the described embodiments, but can be varied within the scope of the enclosed claims.

The invention claimed is:

1. A method for producing direct reduced metal material, comprising the steps:
   a) charging metal material to be reduced into a furnace space;
   b) evacuating an existing atmosphere from the furnace space so as to achieve a gas pressure of less than 1 bar inside the furnace space;
   c) providing heat and hydrogen gas into the furnace space, so that heated hydrogen gas heats the charged metal material to a temperature high enough so that metal oxides present in the metal material are reduced, in turn causing water vapour to be formed, which provision of hydrogen gas is performed so that a pressure of more than 1 bar builds up inside the furnace space; and
   d) before an evacuation of gases from the furnace space back to atmospheric pressure, condensing and collecting the water vapour formed in step c in a condenser below the charged metal material; and
   e) before an evacuation of gases from the furnace space back to atmospheric pressure, providing a carbon-containing gas to the furnace space, so that the heated and reduced metal material is carburized by said carbon-containing gas.

2. The method according to claim 1, wherein steps c and d are performed at least until a hydrogen partial pressure of more than 1 bar has been reached inside the furnace space, and wherein no hydrogen gas is evacuated from the furnace space until said partial pressure of more than 1 bar has been reached.

3. The method according to claim 1, wherein step c further comprises, in an initial heating step, providing heat and hydrogen gas to the furnace space, so that heated hydrogen gas heats the charged metal material to a temperature above the boiling temperature of water contained in the metal material, causing said contained water to evaporate.

4. The method according to claim 3, wherein the provision of hydrogen gas to the furnace space in said initial heating step is controlled to be so slow so that a pressure equilibrium is substantially maintained throughout the performance of said initial heating step.

5. The method according to claim 1, wherein the evacuation in step b is performed so that a pressure of at the most 0.5 bar is reached inside the furnace space.

6. The method according to claim 1, wherein at least part of the heat provided in step c is provided directly to the hydrogen gas also provided in step c.

7. The method according to claim 1, wherein at least part of the heat provided in step c is provided directly to the carbon-containing gas provided in step e.

8. The method according to claim 6, wherein said heat is provided to the provided gas in question by heating elements arranged in a top part of the furnace space.

9. The method according to claim 1, wherein hydrogen gas to be provided in step c is preheated in a heat exchanger, which heat exchanger is arranged to transfer thermal energy from the evaporated water to the hydrogen gas to be provided in step c.

10. The method according to claim 1, wherein carbon-containing gas to be provided in step c is preheated in a heat exchanger, which heat exchanger is arranged to transfer thermal energy from the evaporated water to the carbon-containing gas to be provided in step e.

11. The method according to claim 1, wherein the provision of hydrogen gas in step c and/or the provision of the carbon-containing gas in step e are performed until a predetermined pressure has been reached.

12. The method according to claim 11, wherein the predetermined pressure is a pressure of at least 2.3 bar, such as at least 2.5 bar, such as at least 3 bar.

13. The method according to claim 1, wherein the provision of hydrogen gas and heat in step c and the condensing in step d are performed until a steady state is reached, in terms of it no longer being necessary to provide more hydrogen gas in order to maintain a reached steady state gas pressure inside the furnace space.

14. The method according to claim 13, wherein the steady state gas pressure is a pressure of at least 2.3 bar, such as at least 2.5 bar, such as at least 3 bar.

15. The method according to claim 1, wherein the provision of heat in step c and the condensing in step d are performed until the charged metal material to be reduced has reached a predetermined temperature.

16. The method according to claim 1, wherein during the performing of step c, there is a net flow downwards of water vapour through the charged metal material.

17. The method according to claim 1, wherein steps c, d and e are performed during at least 0.25 hours.

18. The method according to claim 17, wherein the main reduction and carburization step in step c is performed iteratively, in each iteration allowing a steady state pressure to be reached inside the furnace space before supplying an additional amount of heat and hydrogen gas.

19. The method according to claim 1, wherein the carbon-containing gas is a gaseous hydrocarbon, and wherein no carbon monoxide is supplied to the furnace space in step e.

20. The method according to claim 1, step e is at least partly performed at the same time as steps c and d.

21. The method according to claim 1, wherein said heat is provided in step c until the metal material reaches a temperature of at least 500° C., such as at least 600° C., before the provision of the carbon-containing gas starts in step e.

22. The method according to claim 1, wherein step e only starts after the metal material has reached a temperature of between 350-450° C.

23. The method according to claim 1, wherein step e only starts after the metal material has reached a temperature of between 450-550° C., wherein step c is thereafter ended, and wherein step e also comprises providing heat to the furnace space.

24. The method according to claim 1, wherein said heat is provided in step c until the metal material reaches a temperature of between 700-1100° C., such as between 800-1100° C.

25. The method according to claim 24, wherein step d comprises providing heat to the furnace space at constant pressure, which pressure is controlled by a controlled supply of carbon-containing gas, which carbon-containing may be mixed with hydrogen gas.

26. The method according to claim 1, wherein the finally carburized metal material, after the finishing of step e, has a carbon content of between 1-4% by weight.

27. A system for producing direct reduced metal material, comprising
a closed furnace space arranged to receive charged metal material to be reduced;
an atmosphere evacuation means arranged to evacuate an existing atmosphere from the furnace space so as to achieve a gas pressure of less than 1 bar inside the furnace space;
a heat and hydrogen provision means arranged to provide heat and hydrogen gas to the furnace space;
a control device arranged to control the heat and hydrogen provision means so that heated hydrogen gas heats the charged metal material to a temperature high enough so that metal oxides present in the metal material are reduced, in turn causing water vapour to be formed, which provision of hydrogen gas is performed so that a pressure of more than 1 bar builds up inside the furnace space; and
a cooling and collecting means arranged below the charged metal material, arranged to condense and collect the water vapour before an evacuation of gases from the furnace space back to atmospheric pressure, and
a carbon-containing gas provision means arranged to provide a carbon-containing gas to the furnace space, and wherein the control device is arranged to control the carbon-containing gas provision means to provide carbon-containing gas before an evacuation of gases from the furnace space back to atmospheric pressure, so that the heated and reduced metal material is carburized by said carbon-containing gas.

28. The system according to claim 27, wherein the control device is arranged to control the heat and hydrogen provision means, in an initial heating step, so that heated hydrogen gas heats the charged metal material to a temperature above the boiling temperature of water contained in the metal material, causing said contained water to evaporate.

29. The system according to claim 27, wherein the system further comprises a pressure sensor arranged to measure a pressure inside the furnace space, and wherein the control device is arranged to control the heat and hydrogen provision means to provide hydrogen gas until a steady state pressure has been reached.

\* \* \* \* \*